United States Patent
Spears et al.

(10) Patent No.: US 10,494,041 B2
(45) Date of Patent: Dec. 3, 2019

(54) APPARATUS FOR MOUNTING A TRACK FRAME TO A FRAME OF A POWER MACHINE

(71) Applicant: Clark Equipment Company, West Fargo, ND (US)

(72) Inventors: Karl Spears, Bismarck, ND (US); Matthew J. Kaldor, Bismarck, ND (US); Jason Muscha, Bismarck, ND (US); Cameron C. Hansen, Bismarck, ND (US); Justin Ringgenberg, Bismarck, ND (US); Jeret L. Hoesel, Bismarck, ND (US); Ronald S. Hansen, Leonard, ND (US)

(73) Assignee: Clark Equipment Company, West Fargo, ND (US)

(*) Notice: Subject to any disclaimer, the term of this patent is extended or adjusted under 35 U.S.C. 154(b) by 471 days.

(21) Appl. No.: 15/143,089

(22) Filed: Apr. 29, 2016

(65) Prior Publication Data

US 2016/0318565 A1      Nov. 3, 2016

Related U.S. Application Data

(60) Provisional application No. 62/216,762, filed on Sep. 10, 2015, provisional application No. 62/154,369, filed on Apr. 29, 2015.

(51) Int. Cl.
| | |
|---|---|
| *B62D 55/108* | (2006.01) |
| *B62D 55/06* | (2006.01) |
| *B62D 55/10* | (2006.01) |

(52) U.S. Cl.
CPC ......... *B62D 55/1083* (2013.01); *B62D 55/06* (2013.01); *B62D 55/10* (2013.01)

(58) Field of Classification Search
CPC ..... B62D 55/1083; B62D 55/06; B62D 55/10
See application file for complete search history.

(56) References Cited

U.S. PATENT DOCUMENTS

| | | | |
|---|---|---|---|
| 1,892,937 A | 1/1933 | Dubonnet | |
| 2,338,436 A | 1/1944 | Jirsak et al. | |
| (Continued) | | | |

FOREIGN PATENT DOCUMENTS

| | | | | |
|---|---|---|---|---|
| DE | 736724 | * | 4/1942 | ............ B62D 55/06 |
| DE | 736724 C | | 6/1943 | |

OTHER PUBLICATIONS

Invitation to Pay Additional Fees mailed Aug. 25, 2016 for International Application No. PCT/US2016/030228 filed Apr. 29, 2016, 7 pages.

(Continued)

*Primary Examiner* — Joseph M Rocca
*Assistant Examiner* — Michael R Stabley
(74) *Attorney, Agent, or Firm* — John D. Veldhuis-Kroeze; Westman, Champlin & Koehler, P.A.

(57) ABSTRACT

Disclosed embodiments include power machines, track frame assemblies, and apparatus for mounting a track frame assembly to a frame of a power machine. In various disclosed embodiments, mounting structures mount a track frame to the machine frame. In some exemplary embodiments, each mounting structure includes two torsional joints and at least three non-torsional joints between the machine frame and the corresponding track frame. The two torsional joints can be provided by torsion shafts and the corresponding attachments to front and rear arms. In exemplary embodiments, the at least three non-torsional joints are substantially free to rotate and can include a joint between a front axle and the track frame, a joint between a rear axle and a link, and a joint between a link pin and the track frame. In some exemplary embodiments, the front or rear arms are (Continued)

oriented relative to corresponding torsion shafts to improve performance.

23 Claims, 11 Drawing Sheets

(56) References Cited

U.S. PATENT DOCUMENTS

| | | | |
|---|---|---|---|
| 2,650,668 A | 9/1953 | Hopkins | |
| 2,712,742 A | 7/1955 | Neidhart | |
| 2,779,636 A | 1/1957 | Allen | |
| 2,894,592 A | 7/1959 | Ordorica | |
| 3,012,767 A | 12/1961 | Jones, Sr. | |
| 3,275,387 A | 9/1966 | Hedges | |
| 3,436,069 A | 4/1969 | Henschen | |
| 3,601,424 A | 8/1971 | Badland et al. | |
| 3,774,708 A | 11/1973 | Purcell et al. | |
| 3,826,325 A | 6/1974 | Purcell et al. | |
| 4,072,203 A | 2/1978 | Pierson | |
| 4,723,790 A | 2/1988 | Wharton | |
| 4,953,919 A | 9/1990 | Langford | |
| 4,966,386 A | 10/1990 | Werdich | |
| 5,997,109 A | 12/1999 | Kautsch | |
| 6,070,898 A | 6/2000 | Dickie et al. | |
| 6,234,507 B1 | 5/2001 | Dickie et al. | |
| 6,234,590 B1 | 5/2001 | Satzler | |
| 6,435,291 B2 | 8/2002 | Lemke et al. | |
| 6,435,292 B2 | 8/2002 | Lemke et al. | |
| 6,447,073 B1 | 9/2002 | Goettker | |
| 6,497,460 B2 | 12/2002 | Lemke et al. | |
| 6,810,975 B2 | 11/2004 | Nagorcka et al. | |
| 6,832,659 B1 | 12/2004 | Bares et al. | |
| 6,869,153 B2 | 3/2005 | Wright et al. | |
| 6,904,986 B2 | 6/2005 | Brazier | |
| 7,182,414 B2 | 2/2007 | Park et al. | |
| 7,188,915 B2 | 3/2007 | Lemke et al. | |
| 7,255,184 B2 | 8/2007 | Loegering et al. | |
| 7,261,287 B2 | 8/2007 | Gehret | |
| 7,552,785 B2 | 6/2009 | Tuhy | |
| 7,562,727 B1 | 6/2009 | Hoffart | |
| 7,798,260 B2 | 9/2010 | Albright et al. | |
| 7,815,000 B2 | 10/2010 | Kisse et al. | |
| 7,967,087 B2 | 6/2011 | Arulraja et al. | |
| 8,191,911 B1 | 6/2012 | Reynolds | |
| 8,226,101 B2 | 7/2012 | Lariviere | |
| 8,297,383 B2 | 10/2012 | Despres | |
| 8,360,179 B2 | 1/2013 | Daniels et al. | |
| 8,573,621 B1 | 11/2013 | Reynolds | |
| 8,794,358 B2 | 8/2014 | Hansen | |
| 2001/0030068 A1 | 10/2001 | Nagorkca et al. | |
| 2003/0146662 A1 | 8/2003 | Haringer | |
| 2007/0029871 A1 | 2/2007 | Wake et al. | |
| 2007/0169978 A1 | 7/2007 | Patmont et al. | |
| 2009/0321152 A1 | 12/2009 | Arulraja et al. | |
| 2010/0060075 A1 | 3/2010 | Hansen | |
| 2011/0227309 A1 | 9/2011 | Arulraja et al. | |
| 2012/0012407 A1 | 1/2012 | Daniels et al. | |
| 2012/0090903 A1 | 4/2012 | Bessette et al. | |
| 2013/0119753 A1 | 5/2013 | Paré et al. | |
| 2014/0338991 A1* | 11/2014 | Hansen | B62D 55/04 180/9.21 |

OTHER PUBLICATIONS

International Search Report and Written Opinion dated Dec. 6, 2016 for International Application No. PCT/US2016/030228 filed Apr. 29, 2016, 20 pages.

* cited by examiner

APPARATUS FOR MOUNTING A TRACK FRAME TO A FRAME OF A POWER MACHINE

CROSS-REFERENCE TO RELATED APPLICATION

This application claims the benefit of U.S. Provisional Application No. 62/154,369, filed Apr. 29, 2015 and U.S. Provisional Application No. 62/216,762, filed Sep. 10, 2015.

BACKGROUND

The present disclosure is directed toward power machines. More particularly, the present disclosure is related to the mounting of track frames, which carry endless tracks or tractive elements, to the frame of a power machine.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Tractive elements are devices that engage a support surface such as the ground to cause the power machine to move over the support surface. Many power machines employ wheels as tractive elements, but other power machines employ endless tracks, skids, or any combination of tractive elements. Some power machines that include endless tracks include track frames with various components mounted to them for the purpose of engaging the endless track and provide proper tensioning of the endless track. These components typically include idlers, rollers, or some combination of idlers and rollers.

Track frames can be rigidly mounted to the frame of the power machine and use suspension members in the track frames to dampen the shock introduced to the power machine and to prevent transmission of the shock into the machine frame. In other machines, to lessen transmission of shock into the machine frame and improve operator experience, track frames are mounted to the frame such that limited movement between the track frames and the machine frame is possible. Some suspension systems for power machines do not sufficiently dampen shock and therefore make use of the machine by an operator more difficult or less comfortable. Further, some suspension systems do not perform well when performing work functions which apply forces on the machine, for example when digging, cutting grade, etc. In many suspension systems, under these types of work conditions, the front end of the machine tends to dip down in response to applied forces, which can adversely affect performance of the power machine, for example, by making it more difficult to cut a grade.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machines, track frame assemblies, and apparatus for mounting a track frame assembly to a frame of a power machine. In various disclosed embodiments, mounting structures mount a track frame to the machine frame. In some exemplary embodiments, each mounting structure includes two torsional or biased joints and at least three non-torsional or unbiased joints between the machine frame and the corresponding track frame. The two torsional or biased joints can be provided by torsion shafts and the corresponding attachments to front and rear arms, such that the biased joints are biased against rotation. In exemplary embodiments, the at least three non-torsional or unbiased joints are substantially free to rotate and can include a joint between a front axle and the track frame, a joint between a rear axle and a link, and a joint between a link pin and the track frame.

In some exemplary embodiments, a front arm is coupled to a front torsion shaft such that the front arm is oriented to extend forward and upward of the front torsion shaft. Further, in these or in other embodiments, a rear arm is coupled to a rear torsion shaft such that the rear arm is oriented to extend rearward and upward of the rear torsion shaft.

In some embodiments, a mounting structure is provided to mount the torsion axle tube to the frame of the power machine. The mounting structure, and a corresponding channel formed in or connected to the frame of the power machine, allow the torsion axle to be secured to the frame in a manner that avoids or reduces shear loads on corresponding fasteners.

In some more particular embodiments, a power machine includes a machine frame, and first and second track frames each positioned on different sides of the machine frame. First and second front mounting structures each mount one of the first and second track frames to the machine frame. In these more particular exemplary embodiments, each of the first and second front mounting structures includes: a front torsion shaft coupled to the machine frame; a front arm coupled to the front torsion shaft, with the front arm oriented to extend forward and upward from the front torsion shaft; and a front axle coupled between the front arm and the corresponding first or second track frame. The power machine also includes first and second rear mounting structures each mounting one of the first and second track frames to the machine frame rearward of the front mounting structures. In these more particular embodiments, each of the first and second rear mounting structures includes: a rear torsion shaft coupled to the machine frame; a rear arm coupled to the rear torsion shaft; a rear axle coupled to the rear arm; a link coupled to the rear axle; and a pin coupled between the link and the corresponding first or second track frame.

In some exemplary embodiments, each track frame has a plurality of rollers with roller axles which are all rigidly mounted to the track frame.

In other more particular embodiments, an apparatus for mounting a first track frame assembly to a frame of a power machine includes: a first torsion joint, including a front tube, mountable to the frame of the power machine, and a front shaft inserted into and extending from the front tube; a front arm coupled to the front shaft, the front arm oriented to extend forward and upward from the front shaft; a front axle attached to the front arm and coupleable to the first track frame assembly; a second torsion joint, including a rear tube, mountable to the frame of the power machine, and a rear shaft inserted into and extending from the rear tube; a rear arm coupled to the rear shaft; a rear axle attached to the rear arm; a link member having first and second ends, the first end of the link member rotatably coupled to the rear axle; and a pin coupled to the second end of the link member and rotatably coupleable to the first track frame assembly.

In yet other more particular embodiments, an apparatus for mounting a first track frame assembly to a frame of a power machine includes: a first torsion joint, including a front tube, mountable to the frame of the power machine, and a front shaft inserted into and extending from the front tube a front arm coupled to the front shaft; a front axle attached to the front arm and coupleable to the first track frame assembly; a second torsion joint, including a rear tube, mountable to the frame of the power machine, and a rear shaft inserted into and extending from the rear tube; a rear arm coupled to the rear shaft, wherein the rear arm is oriented to extend rearward and upward from the rear shaft; a rear axle attached to the rear arm; a link member having first and second ends, the first end of the link member rotatably coupled to the rear axle; and a pin coupled to the second end of the link member and rotatably coupleable to the first track frame assembly.

In still other more particular embodiments, a power machine includes a machine frame and first and second track frames, each positioned on different sides of the machine frame. First and second mounting structures of the power machine each mount one of the first and second track frames to the machine frame. Each of the first and second mounting structures includes two torsional joints and at least three non-torsional joints between the machine frame and the corresponding first or second track frame. In these more particular exemplary embodiments, the at least three non-torsional joints are substantially free to rotate.

In still other more particular embodiments, a track frame assembly, configured to be mounted to a frame of a power machine, includes: a track frame; a front axle rotatably coupled to the track frame; a front arm attached to the front axle; a front torsion joint, including a front tube, mountable to the frame of the power machine, and a front shaft inserted into and extending from the front tube, wherein the front arm is coupled to the front shaft and oriented to extend forward and upward from the front shaft; a pin rotatably coupled to the track frame; a link member coupled to the pin; a rear axle rotatably coupled to the link member; a rear arm attached to the rear axle; and a rear torsion joint, including a rear tube, mountable to the frame of the power machine, and a rear shaft inserted into and extending from the rear tube.

In still further more particular embodiments, a power machine includes: a machine frame having at least two channels; a first track frame positioned on a side of the machine frame; and a first mounting structure mounting the first track frame to the machine frame.

In some of these more particular embodiments, each of the first and second mounting structures include: first and second torsion members each having a tube; and first and second mounting brackets each attached to the tube of a respective one of the first and second torsion members. Each of the first and second mounting brackets includes at least two surfaces having apertures configured to align with apertures in respective ones of the at least two channels to accept fasteners to secure the mounting bracket and the torsion member to the machine frame.

The features of the various disclosed embodiments can be included in differing combinations.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed are methods of, and apparatus for, mounting track frames to a frame of a power machine. The disclosed methods and apparatus, as well as the power machines utilizing the same, provide improved suspension system performance under a variety of work conditions while performing differing work tasks and functions, such as digging, cutting grade, etc. In some embodiments, biased joints such as provided using torsion shafts are utilized with particularly advantageous orientations of arms coupled to the torsion shafts or joints. Other advantageous mounting features and components are also disclosed.

Figure 2:
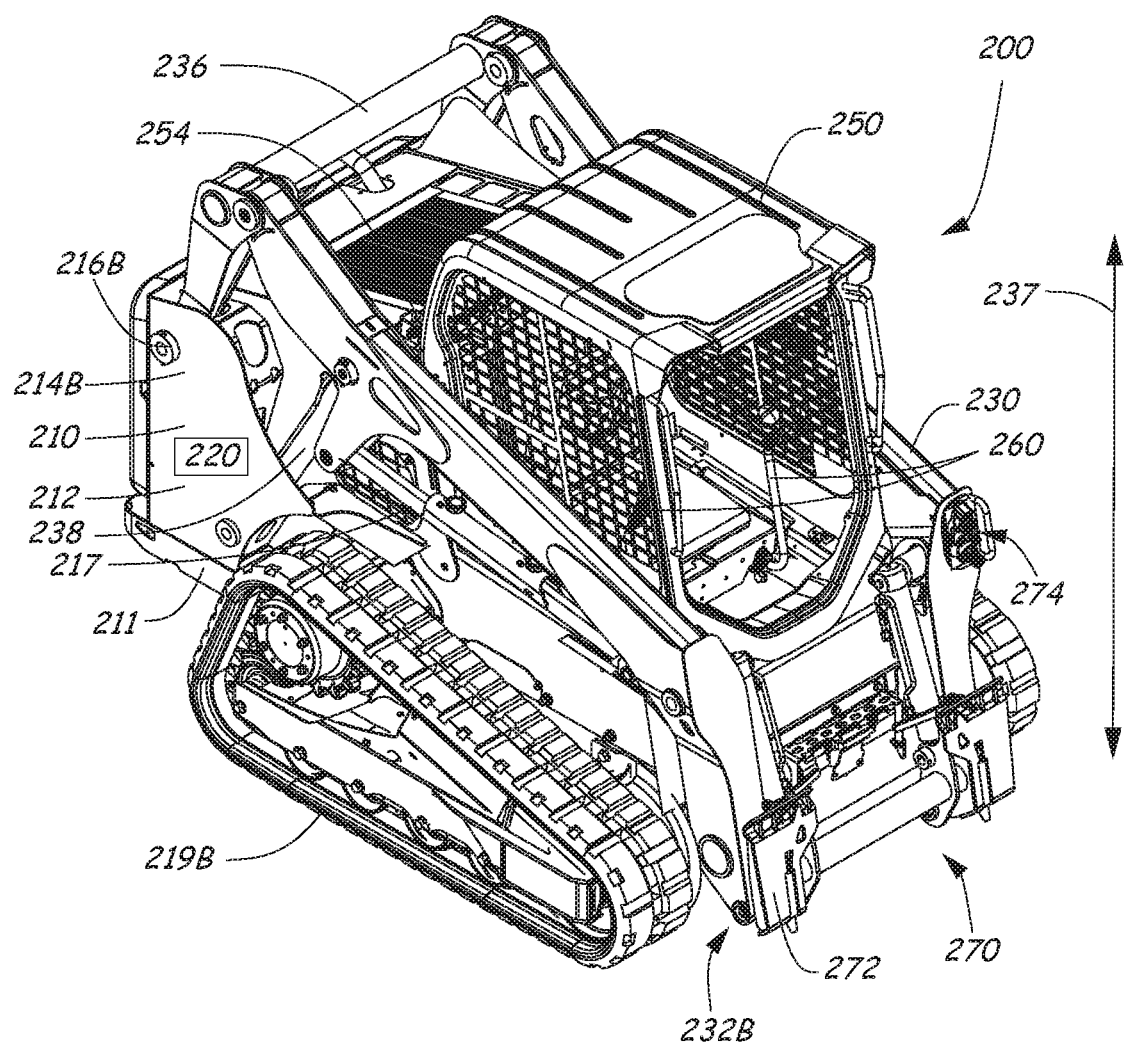
FIG. 2 is a perspective view showing generally a front of a power machine on which embodiments disclosed in this specification can be advantageously practiced.
Figure 3:
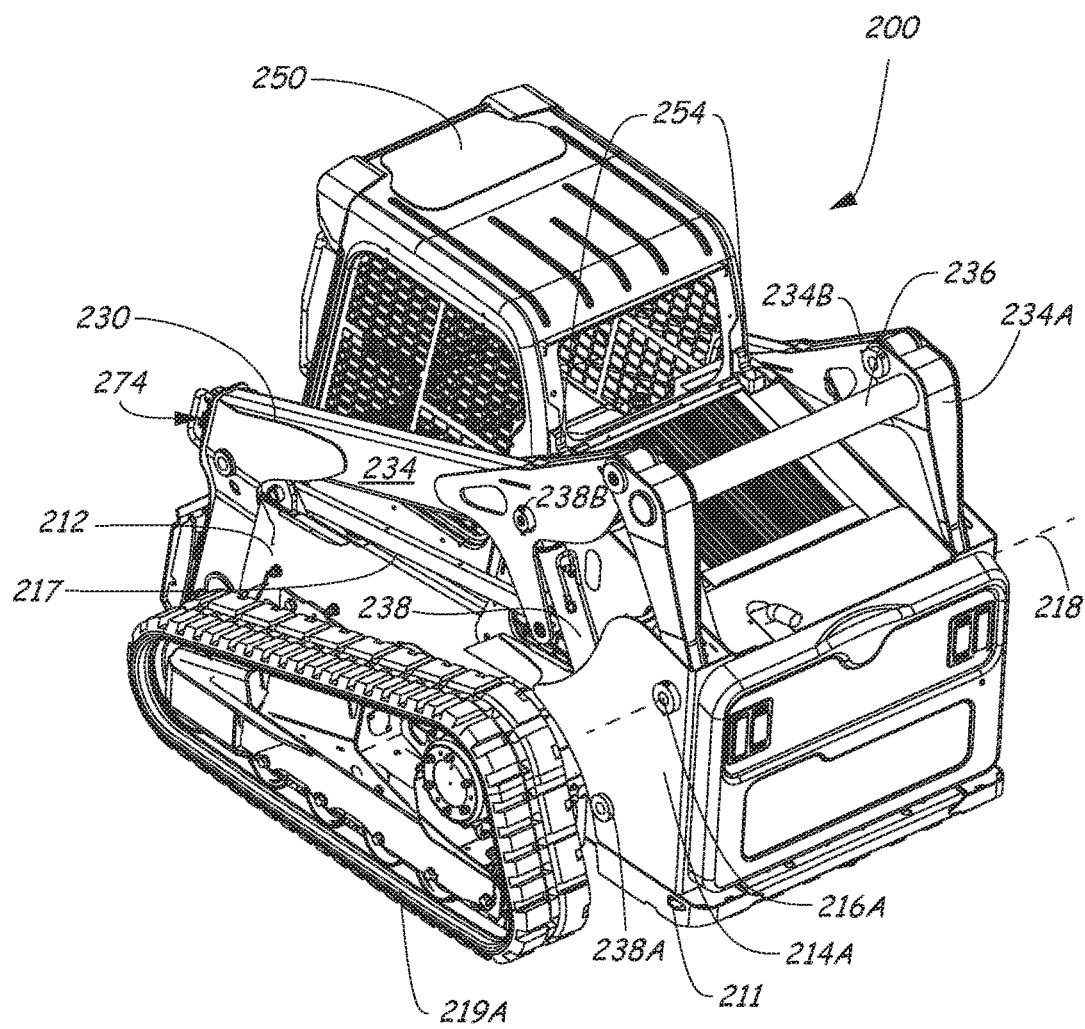
FIG. 3 is a perspective view showing generally a back of the power machine shown in FIG. 2.

These features, and the more general concepts, can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
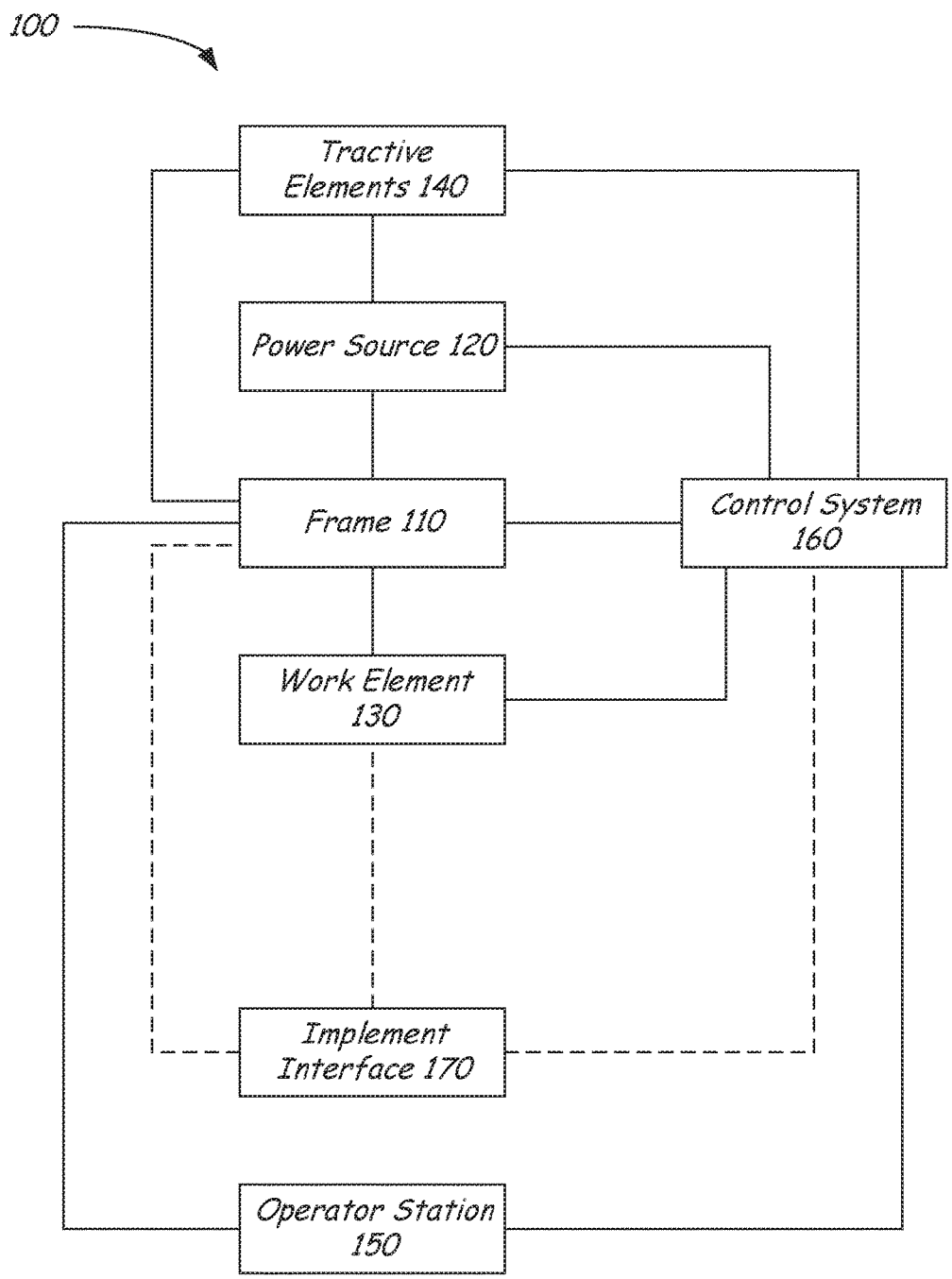
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame. In example embodiments described below, tractive elements include track frame assemblies which are mounted to frame 110 using exemplary mounting structures and techniques.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent to or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of track work vehicles such as various other loaders, excavators, trenchers, and dozers, to name but a few examples.

Loader 200 includes frame 210 that supports a power system 220, the power system being capable of generating or otherwise providing power for operating various functions on the power machine. Frame 210 also supports a work element in the form of a lift arm structure 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm structure 230 in turn supports an implement carrier interface 270, which includes an implement carrier 272 that is capable of receiving and securing various implements to the loader 200 for performing various work tasks and power couplers 274, which are provided to selective provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 219A and 219B. Each of the tractive elements 219A and 219B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
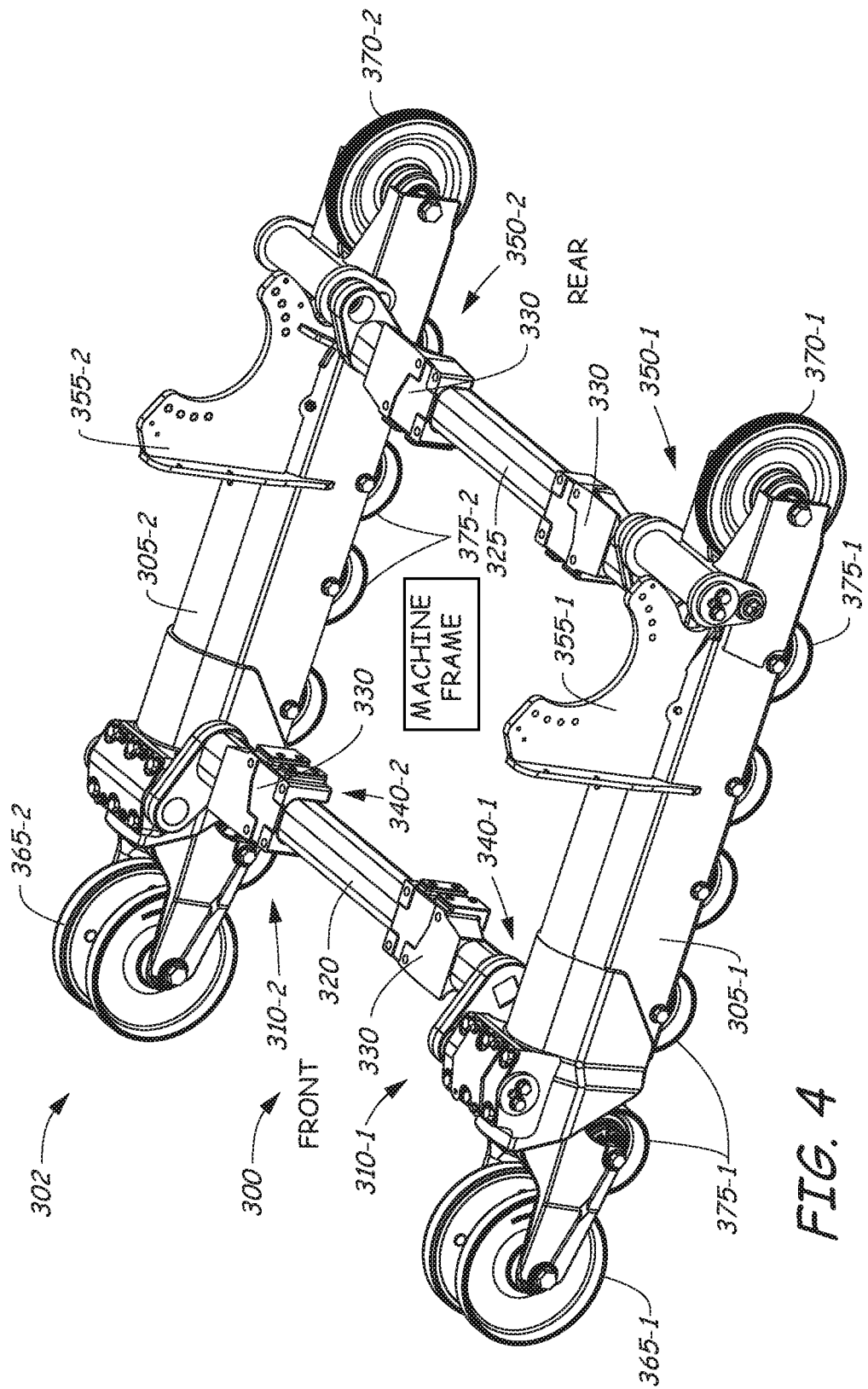
FIG. 4 is an illustration of track frame assemblies and a mounting apparatus configured to mount the track frame assemblies to a power machine frame, for example of the type represented and shown in FIGS. 1-3, in accordance with exemplary disclosed embodiments.

Referring now to FIG. 4, shown is a mounting apparatus 300 configured to mount a pair of track frames or track frame assemblies 305-1 and 305-2 to a machine frame 335. The track frames 305-1 and 305-2, machine frame 335, and mounting apparatus 300 collectively form portions of a power machine 302. Although machine frame 335 is illustrated diagrammatically and other components of power machine 302 are not shown, those of skill in the art will recognize that power machine 302 in FIG. 4 can be several different types of power machines. For example, power machine 302 can be a compact track loader such as shown and represented in FIGS. 1-3, to name one example, and can therefore include other components and systems such as those illustrated in FIGS. 1-3.

Mounting apparatus 300 includes left side mounting apparatus 310-1 and right side mounting apparatus 310-2. Left side mounting apparatus 310-1 includes both front mounting structure 340-1 mounting left track frame assembly 305-1 to machine frame 335 by coupling to a front tube 320, and rear mounting structure 350-1 mounting left track frame assembly 305-1 to the machine frame by coupling to a rear tube 325. Similarly, right side mounting apparatus 310-2 includes both front mounting structure 340-2 mounting right track frame assembly 305-2 to machine frame 335 by coupling to a front tube 320, and rear mounting structure 350-2 mounting right track frame assembly 305-2 to the machine frame by coupling to rear tube 325. As described below in greater detail, tubes 320 and 325 house torsion shafts which form portions of two torsion joints in the mounting apparatus 310-1 and 310-2. Tubes 320 and 325 are attachable to the machine frame 335, for example using mounting brackets 330.

Also shown in FIG. 4, each track frame assembly 305-1, 305-2 includes a motor mount 355-1, 355-2 that holds a drive motor (not shown in FIG. 4) that is in turn coupled to a drive sprocket (not shown in FIG. 4). Drive sprockets engage tractive elements or tracks (not shown) to cause the tracts to rotate. A pair of idlers 365-1 and 370-1, 365-2 and 370-2 is provided on each side to properly tension the corresponding track. Rollers 375-1, 375-2 on the bottom of the track frame assemblies engage the tracks to distribute the weight of the power machine. In some exemplary embodiments, rollers 375-1, 375-2 have roller axles which are all rigidly mounted to the frame assembly 305-1. As described in greater detail below, rear mounting structures 350-1 and 350-2 couple to the track frame assemblies rearward of the position of drive sprockets 360-1 and 360-2 in some exemplary embodiments. Also, in these or other exemplary embodiments, rear mounting structures 350-1 and 350-2 couple to the track frame assemblies rearward of a center of gravity of the power machine.

Figure 5:
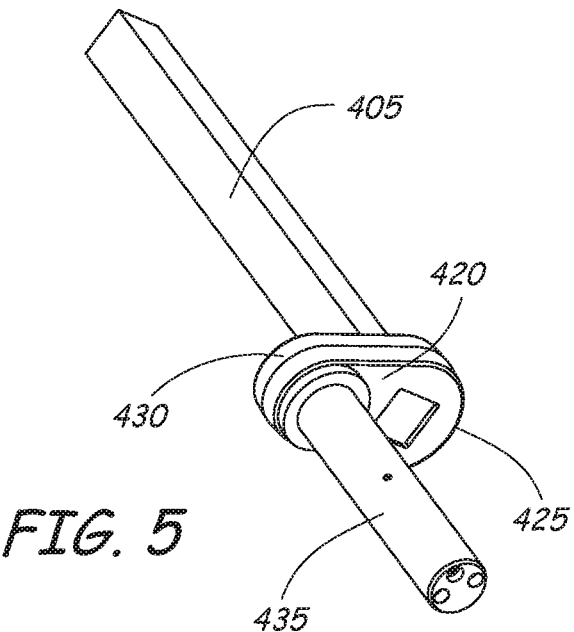
FIGS. 5 and 6 are illustrations of components of a torsion joint, an arm and an axle used in front and rear mounting structures in accordance with exemplary disclosed embodiments.
Figure 6:
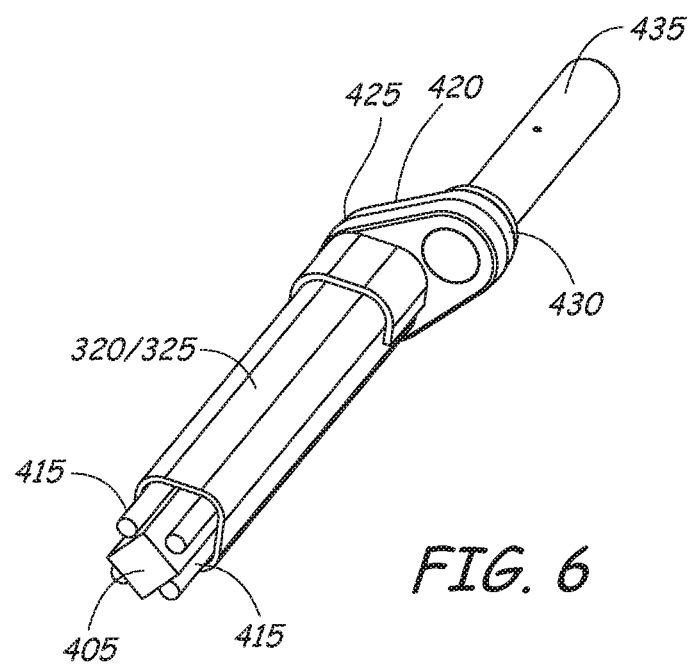

As discussed above, each of tubes 320 and 325 contains components that form portions of torsion joints of a type that are known in the art. Referring now to FIGS. 5 and 6, shown are components of such torsion joints, along with an arm 420 and an axle 435. Each front mounting structure (referred to more generally by reference number 340) and each rear mounting structure (referred to more generally by reference number 350) includes an arm 420 and an axle 435, and further includes, or couples to, a torsion joint. Arms 420 are identified as being similar in both the front and back on each side of the machine. However, the front arms may be of a different length than those in the back to achieve a desired geometry.

In exemplary embodiments, tubes 320 and 325 are rubber torsion suspension tubes, for example of the type which are commercially available under the brand name Torflex®, though other embodiments of tubes 320 and 325 can be used instead. Shown diagrammatically in FIG. 6 are portions of tubes 320/325 with portions of the tubes omitted or shown in phantom to illustrate the components inside of the tubes. In exemplary embodiments, inside of each tube are shafts 405 inserted into the tube at a 45° angle relative to the major surfaces of the tube. Four rubber isolators 415 are positioned between the tube and each shaft 405 to hold the shaft in place and allow the shaft some degree of rotation with respect to the tube to create torsional joints. In exemplary embodiments, in forming rubber torsion suspension axles, the rubber rods 415 are inserted by stretching the rubber and freezing it. The rods 415 are inserted, and as the rubber warms and contracts, an interference fit is achieved between each shaft 405 and the corresponding tube, thus holding the shaft inside the tube. While only one end of a tube 320/325 is shown, in exemplary embodiments, each tube has two shafts 405 positioned in its interior, one inserted on each end. The left side or end shaft and the right side or end shaft are not connected, and thus, the left and right sides can operate independently of each other. Similarly, each of the rods 405 has its own four rubber isolators 415, i.e. there are a total of eight rubber isolators in each of tubes 320 and 325.

Figure 7:
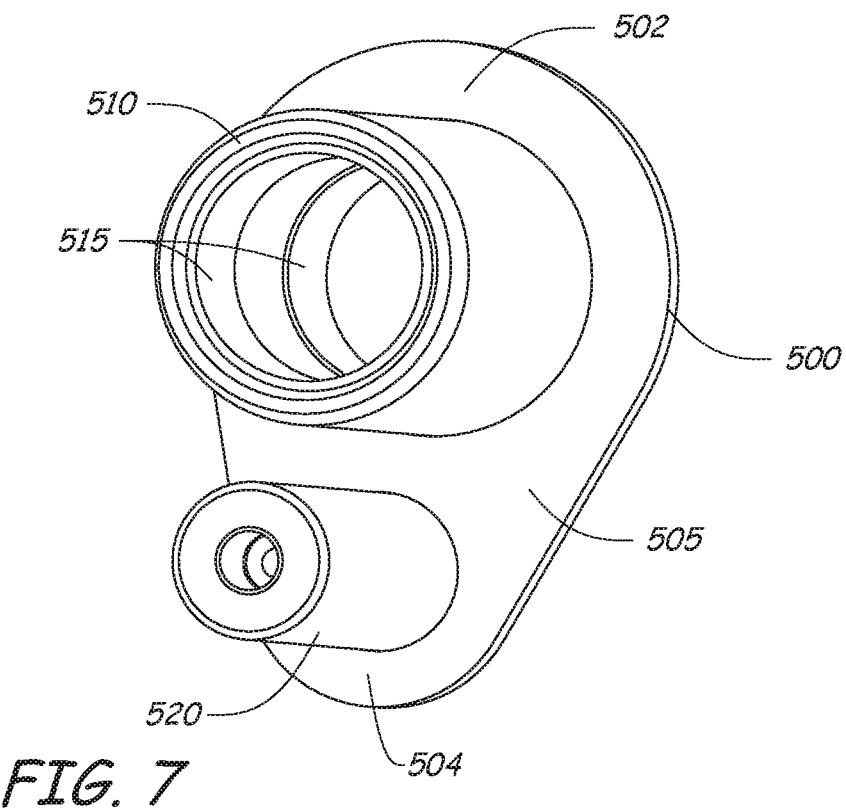
FIG. 7 is an illustration of a link member used in rear mounting structures in accordance with exemplary disclosed embodiments.

In each mounting structure 340/350, a first end 425 of an arm 420 is coupled to shaft 405 of the torsion joint. In exemplary embodiments, arm 420 is fixedly coupled or attached to the shaft 405 and therefore can rotate only as much as the torsion shaft can rotate under force within its corresponding tube. Also in each mounting structure 340/350, an axle 435 is fixedly attached to a second end 430 of arm 420. In each front mounting structure 340, axle 435 is rotatably coupled to track frame 305. However, in each rear mounting structure 350, a link or link member is coupled between the track frame and the rear arm as described below. An exemplary link 500 is shown in FIG. 7. Link 500 includes, in one exemplary embodiment, a substantially flat base portion 505, a boss or axle receiving member 510 at a first end 502, and a pin 520 at a second end 504. Boss 510 has bearing surfaces 515 sized and configured to receive and rotatably couple first end 502 of link 500 to axle 435 in each rear mounting structure. Pin 520 rotatably couples second end 504 of the link to track frame 305.

Figure 8:
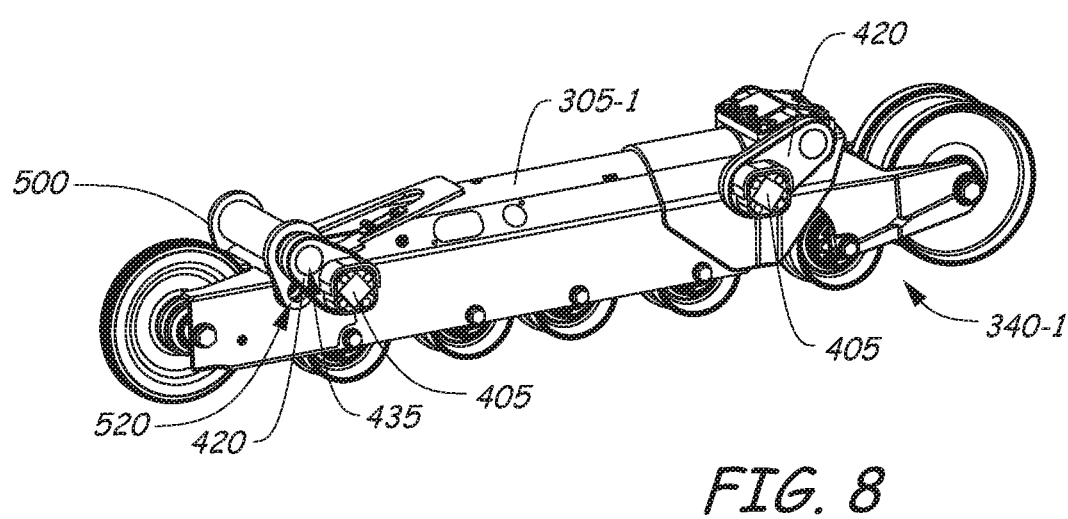
FIG. 8 is an illustration of a track frame assembly and portions of the mounting structures, illustrating front and rear arm orientations in accordance with exemplary disclosed embodiments.
Figure 9:
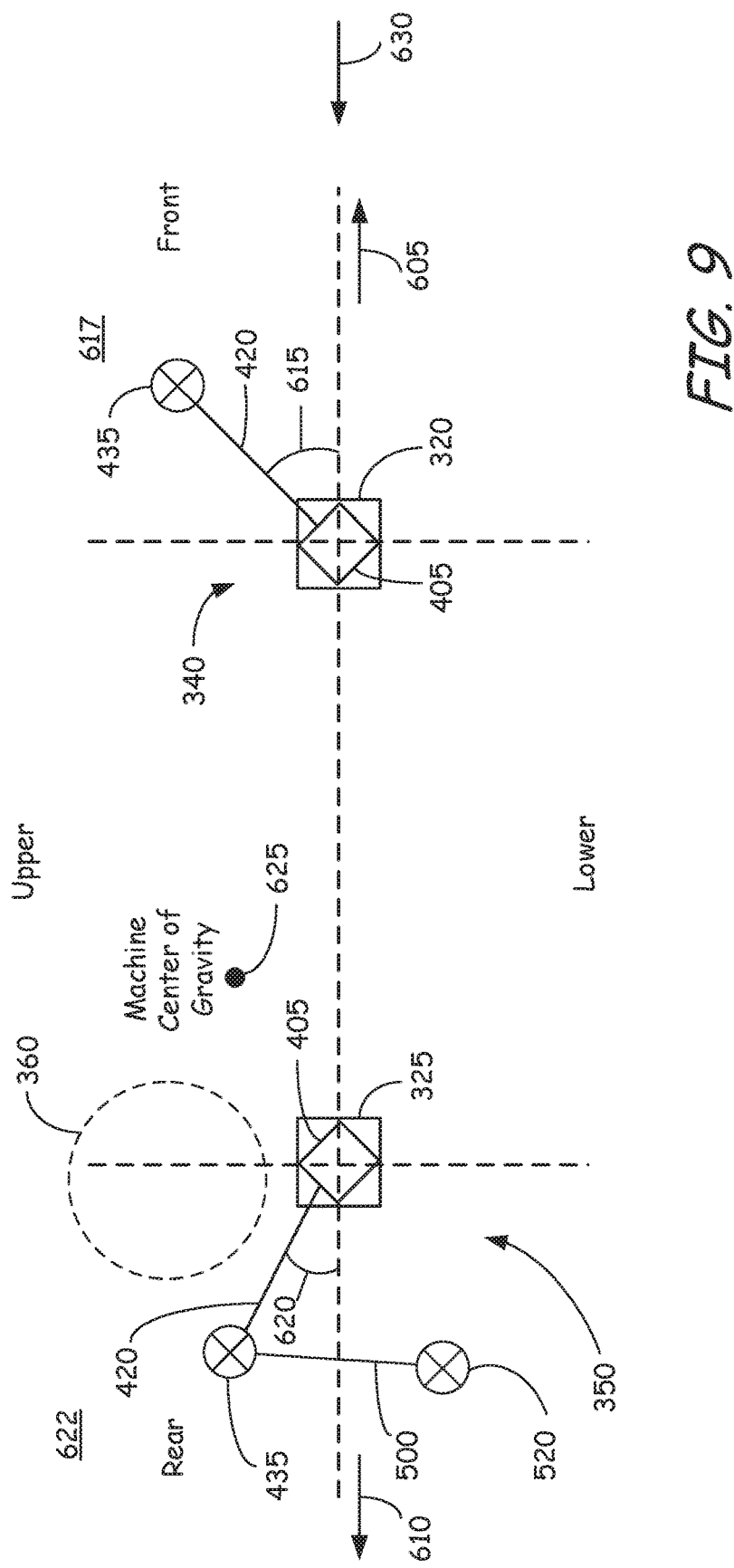
FIG. 9 is a diagrammatic illustration of portions of the mounting structures shown in FIG. 8, illustrating front and rear arm orientations in accordance with exemplary disclosed embodiments.

Referring now to FIG. 8, shown is a perspective view of left side track frame assembly 305-1, with portions of the mounting structures shown, illustrating front and rear arm orientations in accordance with exemplary disclosed embodiments. Also referring to FIG. 9, shown is a diagrammatic illustration of portions of the mounting structures, illustrating quadrants of front and rear arm orientations in accordance with exemplary disclosed embodiments. As shown in FIGS. 8 and 9, arm 420 of the front mounting structure 340-1 is coupled to front torsion shaft 405 and is oriented such that arm 420 extends forward and upward from the front torsion shaft. Axle 435 of front mounting structure 340-1 is rotatably coupled to track frame assembly 305-1. Relative to a horizontal direction 605 of forward machine travel, arm 420 extends forward and upward from the front torsion shaft 405 at an angle 615, which is less than 90°, into a quadrant 617. In some exemplary embodiments, the angle 615 can be selected, for parameters of a particular power machine, such that a horizontally applied load 630 on a front end of the machine will result in substantially balanced, or at least more balanced, moments imparted on the machine. This in turn reduces angular motion of the front torsion shaft and results in less occurrence of the front end of the power machine dipping down in response to the horizontally applied load.

As shown in FIGS. 8 and 9, arm 420 of the rear mounting structure 350-1 is coupled to rear torsion shaft 405 and, in some exemplary embodiments, is oriented such that the rear arm extends rearward and upward from the rear torsion shaft. Axle 435 of rear mounting structure 350-1 is rotatably coupled to link 500. Pin 520 of link 500 is rotatably coupled to track frame assembly 305-1. Relative to a horizontal direction 610 of rearward machine travel, rear arm 420 extends rearward and upward from the rear torsion shaft 405 at an angle 620, which is less than 90°, into a quadrant 622. In some exemplary embodiments, the angle 615 can be selected, for parameters of a particular power machine, to handle loads from the rear of the power machine when travelling rearward. It should be noted that, while in some exemplary embodiments the front arm is oriented forward and upward of the front torsion shaft and the rear arm is oriented rearward and upward of the rear torsion shaft, in other embodiments only one of the front and rear arms have this described orientation.

In some exemplary embodiments, pin 520 of link 500 in each rear mounting structure is coupled to its corresponding track frame assembly at a position rearward of the corresponding drive sprocket 360. Further, in some exemplary embodiments, pin 520 of link 500 is coupled to its corresponding track frame assembly at a position rearward of the center of gravity 625 of the power machine. Each of these configurations has been found to provide improved power machine performance.

As described above, disclosed embodiments include a power machine 302 having a machine frame 335 and first and second track frames or track frame assemblies 305-1 and 305-2 positioned on different sides of the machine frame. First and second front mounting structures 340-1 and 340-2 each mount one of the first and second track frames to the machine frame. Each of the first and second front mounting structures includes a front torsion shaft 405 coupled to the machine frame, a front arm 420 coupled to the front torsion shaft, and a front axle coupled between the front arm and the corresponding first or second track frame. In exemplary embodiments, the front arm 420 is oriented to extend forward and upward from the front torsion shaft. In some embodiments, the front arm is oriented to extend forward and upward from the front torsion shaft into a quadrant forward and upward from the front torsion shaft at an angle 615, relative to a horizontal direction of machine travel, selected based on machine parameters of the particular power machine.

The power machine 302 also includes first and second rear mounting structures 350-1 and 350-2, each mounting one of the first and second track frames 305-1 and 305-2 to the machine frame 335 rearward of the front mounting structures. Each rear mounting structure includes a rear torsion shaft 405 coupled to the machine frame, a rear arm 420 coupled to the rear torsion shaft, a rear axle 435 coupled to the rear arm, a link 500 coupled to the rear axle, and a pin 520 coupled between the link and the corresponding first or second track frame. In some disclosed embodiments, in each of the first and second rear mounting structures, the rear arm 420 is oriented to extend rearward and upward from the rear torsion shaft 405.

In some disclosed embodiments, in each of the first and second rear mounting structures 350-1 and 350-2, the pin 520 is coupled to the corresponding first or second track frame rearward of a drive sprocket 360 and/or rearward of a center of gravity 625 of the power machine.

Disclosed embodiments also include an apparatus 310-1 or 310-2 configured to mount a first track frame assembly 305 to the frame 335 of the power machine. The apparatus includes a first torsion joint, including a front tube 320, mountable to the frame 335 of the power machine, and a front shaft 405 inserted into and extending from the front tube. A front arm 420 is coupled to the front shaft 405. A front axle 435 is attached to the front arm 420 and is coupleable to the first track frame assembly 305.

The apparatus 310-1 or 310-2 also has a second torsion joint, including a rear tube 325, mountable to the frame 335 of the power machine, and a rear shaft 405 inserted into and extending from the rear tube. A rear arm 420 is coupled to the rear shaft, and a rear axle 435 is attached to the rear arm. A link member 500 has a first end 502 rotatably coupled to the rear axle 435 and a pin 520 attached to a second end 504. The pin is rotatably coupleable to the first track frame assembly.

In some embodiments, the pin 520 is rotatably coupleable to the first track frame assembly rearward of a drive sprocket 360 and/or rearward of a center of gravity 625 of the power machine. Further, in some embodiments, the rear arm 420 is oriented to extend rearward and upward from the rear shaft 405. Additionally or in the alternative, in some embodiments, the front arm 420 is oriented to extend forward and upward from the front shaft 405.

In some exemplary embodiments, as described, a power machine 302 is provided having a machine frame 335 and first and second track frames 305-1 and 305-2 each positioned on different sides of the machine frame. The power machine further includes first and second mounting structures 310-1 and 310-2, each mounting one of the first and second track frames to the machine frame. In some exemplary embodiments, each of the first and second mounting structures 310-1 and 310-2 includes two torsional joints and at least three non-torsional joints between the machine frame and the corresponding first or second track frame. The two torsional joints can be provided by the torsion shafts and the corresponding attachments to front and rear arms 420. The at least three non-torsional joints are substantially free to rotate and can include a joint between the front axle 435 and the track frame, a joint between the rear axle and the link 500, and a joint between the link pin 520 and the track frame.

In some exemplary embodiments, as described, a track frame assembly is provided. The track frame assembly is configured to be mounted to a frame 335 of a power machine 302 and includes a track frame 305, a front axle 435 rotatably coupled to the track frame, and a front arm 420 attached to the front axle. The track frame assembly also includes a front torsion joint, including a front tube 320, mountable to the frame of the power machine, and a front shaft 405 inserted into and extending from the front tube. The front arm 420 is coupled to the front shaft and is oriented to extend forward and upward from the front shaft. The track frame assembly further includes a pin 520 rotatably coupled to the track frame 305 and a link member 500 coupled to the pin. The assembly also includes a rear axle 435 rotatably coupled to the link member 500, a rear arm 420 attached to the rear axle, and a rear torsion joint including a rear tube 325, mountable to the frame of the power machine, and a rear shaft 405 inserted into and extending from the rear tube. The rear arm is attached to the rear shaft.

In some embodiments, the torsional axles formed with shaft 405 inside of a corresponding tube 320/325 are mounted to a frame of a power machine such as the machine frame 335 using a mounting bracket 330, as is shown in FIG. 4. The mounting bracket 330 is configured, in some embodiments, to receive bolts or other fasteners extending in a direction which is substantially parallel to the direction in which the tube 320/325 extends. However, in other exemplary embodiments described below, mounting blocks are provided to avoid or reduce shear loads on the fasteners used to attach the axle tube to the frame. These mounting blocks are also configured such that the majority of the clamp load of the fasteners is used to deform the axle bracket to the mounting block.

Figure 10:
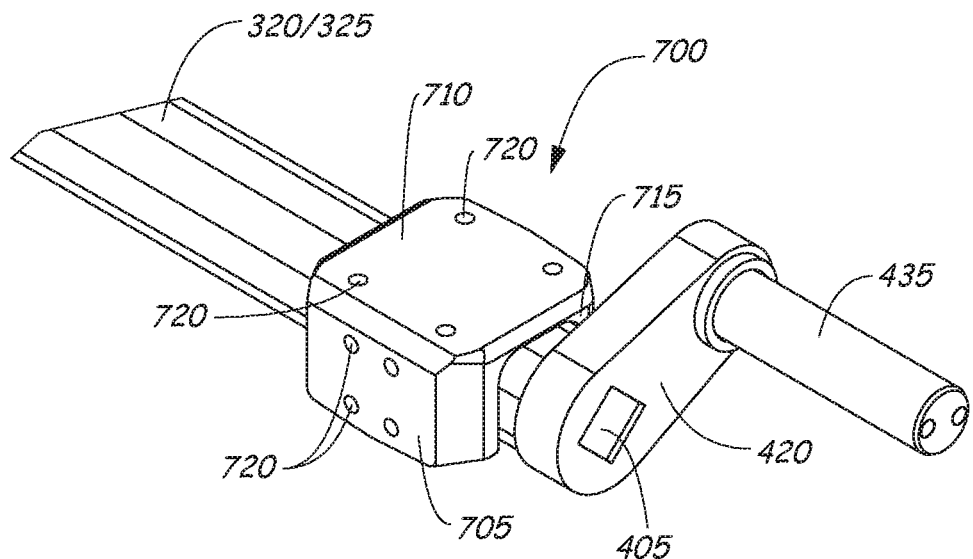
FIG. 10 is an illustration of a mounting structure for mounting a tube of a torsion axle to the frame of the power machine according to one illustrative embodiment.

Referring now to FIG. 10, shown is an embodiment of a mounting block 700 configured to mount torsion axles to the machine frame 335. Each of the axle tubes 320/325 has at least one mounting block 700 for mounting the axle tube to the machine frame 335 and in many embodiments, a pair of mounting blocks, one proximal to each end of the axle tube. For the purposes of brevity, however, only one of the mounting blocks will be discussed going forward. In one exemplary embodiment, mounting block 700 includes three separate pieces 705, 710 and 715, each welded onto or otherwise secured to the axle tube 320/325. In other embodiments, instead of separate side pieces 705 and 715 and top piece 710 each being independently secured to the axle tube, the multiple pieces of the mounting block are secured together. In still other embodiments, mounting block 700 is formed of a single piece instead of having multiple pieces and then attached to the axle tube 320/325. The mounting block 700 can be made out of a casting, by forging, as a one-piece machined part, or by any suitable method of manufacture. Fasteners are used to secure the axle tube to the frame via the mounting block 700.

Figure 11:
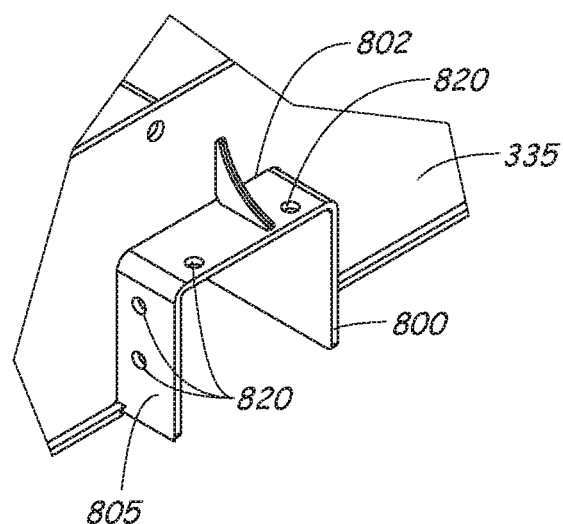
FIG. 11 is an illustration of a portion of the frame of the power machine with a channel configured to receive the tube of the torsion axle and the mounting structure shown in FIG. 10.

FIG. 11 illustrates a portion of machine frame 335 with a bracket 800 formed therein or secured thereto, for example by welding for receiving axle tube 320/325 and be secured to the mounting block according to one exemplary embodiment. Bracket 800 can in some embodiments extend through a channel 802 formed in the machine frame 335. Bracket 800 is configured to receive axle tube 320/325, with a mounting block such as mounting block 700 secured to the tube, such that the mounting block 700 is at least partially contained within bracket 800. Bracket 800 illustratively is attached to machine frame 335 such that it extends at least partially outside of an outer wall of the machine frame.

Referring now to both of FIGS. 10 and 11, mounting block 700 includes fastener receiving apertures 720 for receiving fasteners to secure the mounting block to the bracket 800. In some exemplary embodiments, the fastener receiving apertures 720 are oriented in directions which are substantially perpendicular to the longitudinal direction in which the tube 320/325 extends. Stated alternatively, the mounting block is configured such that the apertures 720 accept or receive the fasteners such that longitudinal directions of the fasteners are oriented substantially perpendicular to the longitudinal direction of the tube 320/325. Fastener receiving apertures 720 in side pieces or sections 705 and 715 extend in directions which are substantially parallel to straight forward or straight reverse travel of the power machine and the fastener receiving apertures 720 in top piece or section 710 extend in directions which are substantially vertically up and down with respect to the support surface (e.g., the ground) upon which the power machine travels.

Bracket 800 includes side sections 805 and 815 and top section 810, configured to align respectively with pieces or sections 705, 710 and 715 of mounting block 700. Fastener receiving apertures 820 are formed in each of sections 805, 810 and 815, and are disposed and arranged to align with corresponding ones of apertures 720 when mounting block 700 and tube 320/325 are positioned within the bracket. The apertures 820 formed in the bracket may be over-sized as compared to the widths of the fasteners 905 (shown in FIG. 12) and the widths of apertures 720 to allow for some misalignment between apertures 720 and 820. The fasteners 905 extend through apertures 820 and into corresponding aligned apertures 720 to mount the torsion axle to the machine frame 335.

Figure 12:
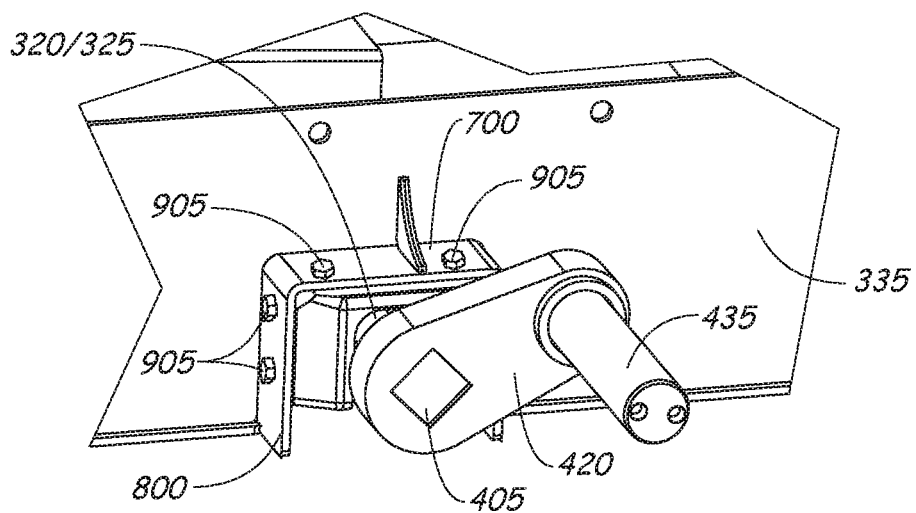
FIG. 12 is an illustration of the tube of the torsion axle and the mounting structure of FIG. 10 mounted to the frame of the power machine using the channel shown in FIG. 11 and fasteners.

FIG. 12 shows the axle tube 320/325 mounted in the bracket 800, and thereby to machine frame 335, by mounting block 700 and fasteners 905. The number and placement of the fasteners may vary. The mounting block 700 is shown here as being completely outside the frame 335 of the power machine. In alternate embodiments, the mounting block 700 can extend into the bracket 800 far enough so that a portion of the mounting block is within the frame 335 of the power machine. In some instances, one or more of the fasteners, including up to all of the fasteners can be positioned inside of the frame 335. The mounting block 700 can also extend outside of the bracket 800. A tapered mounting block 900 is shown in FIG. 13, and is especially advantageous for use in embodiments in which the mounting block extends outside of bracket 800.

Figure 13:
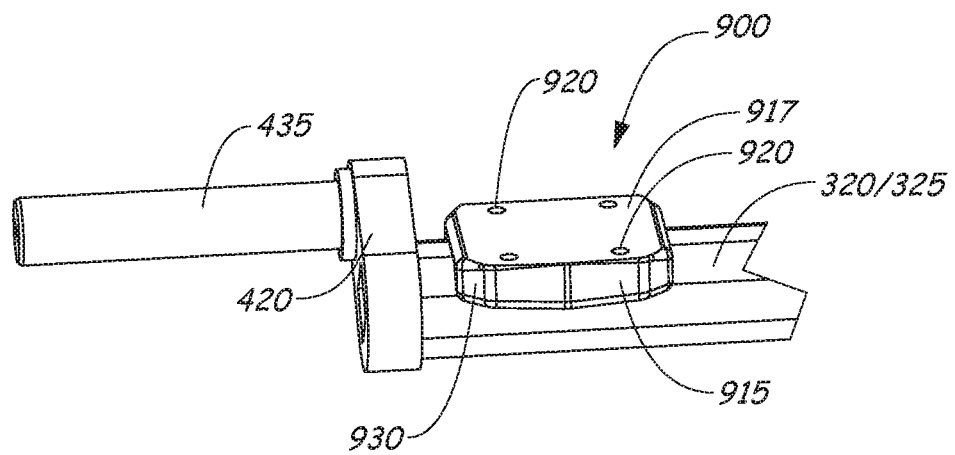
FIG. 13 is an illustration of yet another alternate mounting structure, and illustrating a tapered end feature that distributes the load from the mounting structure to the tube of the torsion axle.

Referring more specifically to FIG. 13, shown is alternate mounting block 900 having a tapered end to better distribute the load from the mounting block to the axle tube by eliminating any abrupt edge between the mounting block/frame 900/335 and the axle tube 320/325. Mounting block 900 can be substantially similar in other respects to mounting block 700. For instance, mounting block 900 is secured to tube 320/325 by welding or by other mechanisms, and can be a single unitary structure having multiple sections (sections 915 and 917 are shown), or can be formed of multiple pieces or sections. Also similarly to mounting block 700, in mounting block 900 apertures 920 are formed in the various sections or pieces in positions which align with apertures 820 in bracket 800. However, mounting block 900 has a tapered end 930, which tapers from the width of the sections (e.g., 915 and 917) down to the width of axle tube 320/325 to better distribute the load from the mounting block to the axle tube.

The design of mounting blocks 700 and 900, and of corresponding bracket 800, eliminates many potential misalignment issues. In one specific example, this is because the bracket 800 extends beyond the mainframe 335 of the power machine. Throughout most of the bracket 800, the tube 320/325 can be substantially narrower than the bracket 800 and the channel 802. It is only at the mounting block 700/900 near the ends of the tube that the axle assembly width (e.g., the width of the assembled tube 320/325 and mounting block 700/900) is nearly as wide as the bracket. Since this part of the bracket 800 is not interrupted by a weldment, there is little deformation that might otherwise be caused by a weld. Mounting blocks 700 and 900 act to space the tube away or apart from the walls of channel 802 and bracket 800 positioned therein.

As mentioned, using mounting blocks such as mounting blocks 700 and 900 avoids or reduces shear loads on the fasteners used to attach the axle tube to the frame, and ensures that the majority of the clamp load of the fasteners is used to deform the axle bracket to the mounting block. With the axle tube 320/325 supported by the fasteners vertically in the upward direction and in the direction of forward and reverse travel by structure, mounting blocks 700 and 900 do not rely on frictional contact created by clamp load to support the axle tubes. In the design of mounting blocks 700 and 900, the hardware does rely on frictional contact created by clamp load to resist side loads. For this reason, if desired, an additional bracket can be added to provide a physical stop for side loading and/or downward vertical loading.

Figure 14:
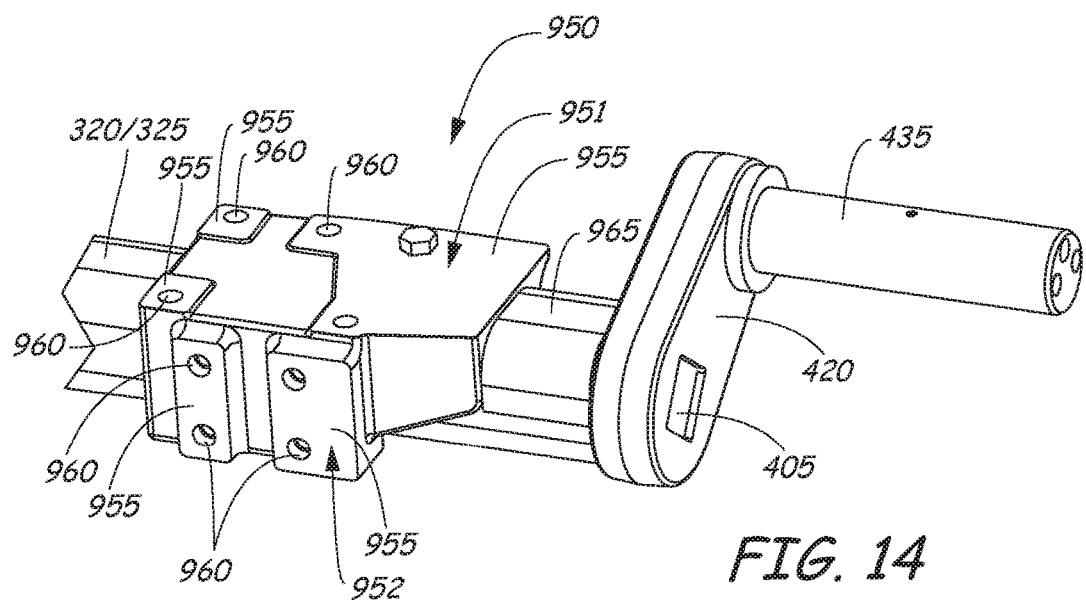
FIGS. 14-15 are illustrations of a mounting structure for mounting a tube of a torsion axle to the frame of the power machine according to another illustrative embodiment.
Figure 15:
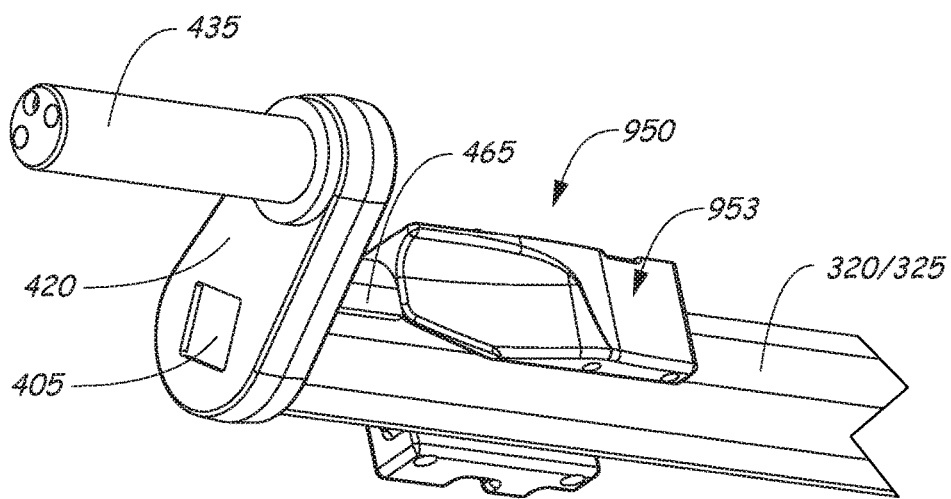

Referring now to FIGS. 14 and 15, shown is an alternate embodiment of a mounting structure including a mounting bracket 950 configured to mount torsion axles to the machine frame 335. Each of the axle tubes 320/325 has at least one mounting bracket 950 for mounting the axle tube to the machine frame 335. In many embodiments, a pair of mounting brackets 950, one proximal to each end of the axle tube, are used to mount the axle tube to the machine frame. For purposes of brevity, only one of the mounting brackets 950 will be discussed.

In one exemplary embodiment, mounting bracket 950 includes a top 951 and first and second sides 952 and 953. Mounting bracket 950 can be made out of a casting, by forging, as a one-pieced machine part, or by any suitable method of manufacture. Mounting bracket 950 is welded or otherwise secured to the axle tube 320/325.

At least two of the three sides (including top 951 and sides 952 and 953) are formed with contact surfaces 955 which are configured to abut the surfaces of a channel 970 (shown in FIG. 16) to mount the torsion axle to the machine frame 335. In one exemplary embodiment, top 951 and side 952 have contact surfaces 955, but side 953 does not. However, in other embodiments, all three of top 951 and sides 952 and 953 include contact surfaces 955. In exemplary embodiments, contact surfaces 955 will always be included on top 951 and on at least one of sides 952 and 953 such that the contact surfaces 955 are not all in the same plane or in parallel planes. Each contact surface 955 includes at least one fastener receiving aperture 960 configured to receive a fastener to mount the axle tube to the channel of frame 335.

Figure 16:
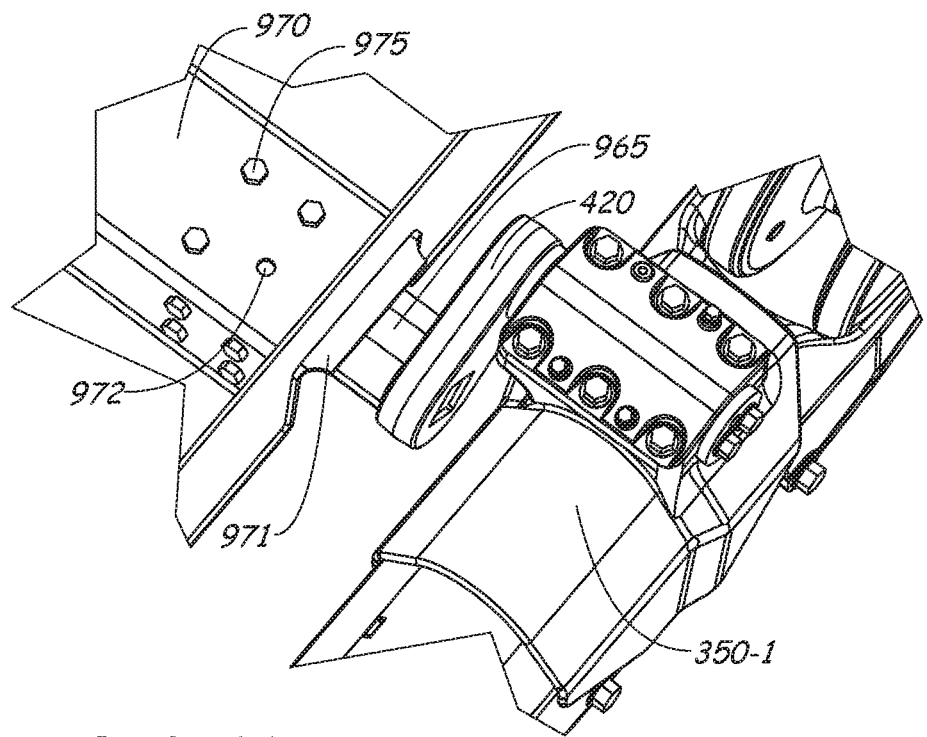
FIG. 16 is an illustration of a portion of the frame of the power machine with a channel configured to receive the tube of the torsion axle and the mounting structure shown in FIGS. 14-15.

Referring now to FIG. 16, shown is frame 335 with a frame mounting structure in the form of a channel 970 extending laterally across at least a portion of a width of the machine frame 335. Channel 970 can be formed inside of machine frame 335, or under machine frame 335. Further, channel 970 can be integrally formed with machine frame 335, or can be otherwise attached to machine frame 335 using welding or other techniques. A single channel 970 can extend across a width of the machine frame and be used in the mounting structures mounting each of two track frame assemblies. In the alternative, the channels used to mount a track assembly on one side of the power machine can be different from the channels used to mount a track assembly on the other side of the machine.

Channel 970 includes fastener receiving apertures 972 which align with apertures 960 in mounting bracket 950 and receive fasteners 975 to mount bracket 950 and axle tube 320/325 to the channel 970 and machine frame 335. Fasteners 975 extend through apertures 972 and into apertures 960 in order to secure mounting bracket 950 and axle tube 320/325 to the machine frame. In exemplary embodiments, in accordance with the existence of apertures 960 on top surface 951 and side surface 952 of mounting bracket 950, channel 970 includes apertures 972 in corresponding channel surfaces such that fasteners 975 extend into mounting bracket 950 in different planes. As was the case with the embodiment illustrated in FIGS. 10-13, in some exemplary embodiments, the fastener receiving apertures 960 and 972 are oriented in directions which are substantially perpendicular to the longitudinal direction in which the tube 320/325 extends. Thus, mounting bracket 950 and channel 970 are configured such that the apertures accept or receive fasteners with the longitudinal directions of the fasteners oriented substantially perpendicular to the longitudinal direction of the tube 320/325.

In some exemplary embodiments, it is important that the axle tubes 320/325 of the torsion axles do not contact machine frame 335 except at contact surfaces 955 of the corresponding attached mounting bracket. This can be used to control the application of forces on the torsion axle.

In some exemplary embodiments, while channel 970 extends between and interior to outer walls of frame 335, a flange or channel portion 971 can extend outside of an outer wall of machine frame 335. However, in some exemplary embodiments, all of the fasteners 975 which attach mounting bracket 950 to channel 970 are positioned inside of the outer frame wall.

Figure 17:
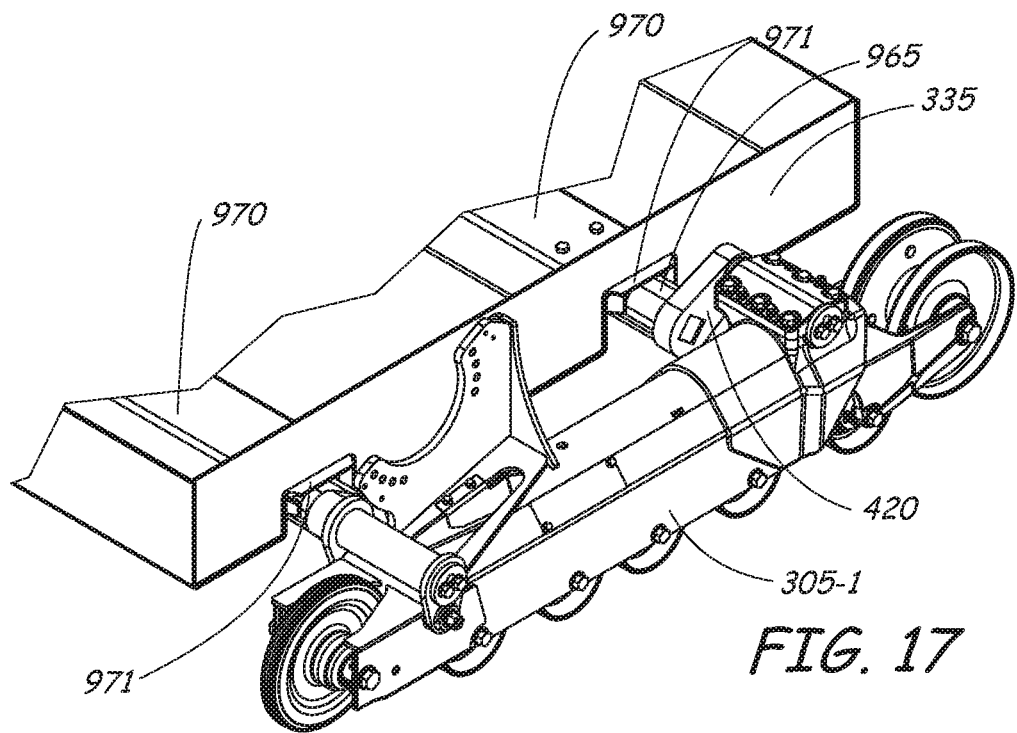
FIG. 17 is an illustration of a track frame assembly and portions of the mounting structures illustrated in FIGS. 14-16.

Referring now to FIG. 17, shown is track assembly 305-1 coupled to machine frame 335 using the mounting bracket and channel configuration described with reference to FIGS. 14-16. Also as shown in FIG. 17, as can be the case in the various disclosed embodiments, rollers 375-1 (and rollers 375-2 which are not shown) have roller axles 376-1 which are all rigidly mounted to the frame of track assembly 305-1.

Although the present invention has been described with reference to preferred embodiments, workers skilled in the art will recognize that changes may be made in form and detail without departing from the spirit and scope of the invention.

What is claimed is:

1. A power machine, comprising:
   a machine frame;
   first and second track frames each positioned on different sides of the machine frame;
   first and second front mounting structures each mounting one of the first and second track frames to the machine frame, each of the first and second front mounting structures comprising:
   a front torsion shaft coupled to the machine frame;
   a front arm coupled to the front torsion shaft, the front arm oriented to extend forward and upward from the front torsion shaft; and
   a front axle coupled between the front arm and the corresponding first or second track frame; and
   first and second rear mounting structures each mounting one of the first and second track frames to the machine frame rearward of the front mounting structures, each of the first and second rear mounting structures comprising:
   a rear torsion shaft coupled to the machine frame;
   a rear arm coupled to the rear torsion shaft;
   a rear axle coupled to the rear arm;
   a link coupled to the rear axle; and
   a pin coupled between the link and the corresponding first or second track frame.

2. The power machine of claim 1, wherein in each of the first and second rear mounting structures, the rear arm is oriented to extend rearward and upward from the rear torsion shaft.

3. The power machine of claim 1, wherein each of the first and second track frames has a plurality of rollers with roller axles which are rigidly mounted to the respective track frame.

4. The power machine of claim 1, wherein in each of the first and second rear mounting structures, the pin is coupled to the corresponding first or second track frame rearward of a drive sprocket.

5. The power machine of claim 1, wherein in each of the first and second rear mounting structures, the pin is coupled to the corresponding first or second track frame rearward of a center of gravity of the power machine.

6. An apparatus for mounting a first track frame assembly to a frame of a power machine, comprising:
a first torsion joint, including a front tube, mountable to the frame of the power machine, and a front shaft inserted into and extending from the front tube;
a front arm coupled to the front shaft, the front arm oriented to extend forward and upward from the front shaft;
a front axle attached to the front arm and coupleable to the first track frame assembly;
a second torsion joint, including a rear tube, mountable to the frame of the power machine, and a rear shaft inserted into and extending from the rear tube;
a rear arm coupled to the rear shaft;
a rear axle attached to the rear arm;
a link member having first and second ends, the first end of the link member rotatably coupled to the rear axle;
a pin coupled to the second end of the link member and rotatably coupleable to the first track frame assembly.

7. The apparatus of claim 6, wherein the pin is rotatably coupleable to the first track frame assembly rearward of a drive sprocket.

8. The apparatus of claim 6, wherein the pin is rotatably coupleable to the first track frame assembly rearward of a center of gravity of the power machine.

9. The apparatus of claim 6, wherein the rear arm is oriented to extend rearward and upward from the rear shaft.

10. An apparatus for mounting a first track frame assembly to a frame of a power machine, comprising:
a first torsion joint, including a front tube, mountable to the frame of the power machine, and a front shaft inserted into and extending from the front tube;
a front arm coupled to the front shaft;
a front axle attached to the front arm and coupleable to the first track frame assembly;
a second torsion joint, including a rear tube, mountable to the frame of the power machine, and a rear shaft inserted into and extending from the rear tube;
a rear arm coupled to the rear shaft, wherein the rear arm is oriented to extend rearward and upward from the rear shaft;
a rear axle attached to the rear arm;
a link member having first and second ends, the first end of the link member rotatably coupled to the rear axle;
a pin coupled to the second end of the link member and rotatably coupleable to the first track frame assembly.

11. The apparatus of claim 10, wherein the pin is rotatably coupleable to the first track frame assembly rearward of a drive sprocket.

12. The apparatus of claim 10, wherein the pin is rotatably coupleable to the first track frame assembly rearward of a center of gravity of the power machine.

13. A power machine, comprising:
a machine frame;
first and second track frames each positioned on different sides of the machine frame; and
first and second mounting structures each mounting one of the first and second track frames to the machine frame, each of the first and second mounting structures comprising two biased joints and at least three unbiased joints between the machine frame and the corresponding first or second track frame, wherein the at least three unbiased joints are substantially free to rotate without bias, while the at least two biased joints are biased against rotation, and wherein each of the first and second mounting structures include a front mounting structure mounting the corresponding track frame to the machine frame and a rear mounting structure mounting the corresponding track frame to the machine frame, wherein the rear mounting structure comprises at least two unbiased joints of the at least three unbiased joints.

14. A track frame assembly configured to be mounted to a frame of a power machine, comprising:
a track frame;
a front axle rotatably coupled to the track frame;
a front arm attached to the front axle;
a front torsion joint, including a front tube, mountable to the frame of the power machine, and a front shaft inserted into and extending from the front tube, wherein the front arm is coupled to the front shaft and oriented to extend forward and upward from the front shaft;
a pin rotatably coupled to the track frame;
a link member coupled to the pin;
a rear axle rotatably coupled to the link member;
a rear arm attached to the rear axle;
a rear torsion joint, including a rear tube, mountable to the frame of the power machine, and a rear shaft inserted into and extending from the rear tube.

15. A power machine, comprising:
a machine frame;
a track frame positioned on a side of the machine frame; and
a mounting structure mounting the track frame to the machine frame, the mounting structure comprising:
a torsion member having a tube; and
a mounting bracket attached to the tube including at least two surfaces having apertures configured to align with apertures on the machine frame to accept fasteners to secure the mounting bracket and the torsion member to the machine frame, wherein the at least two surfaces having the apertures are in different, non-parallel planes from each other.

16. The power machine of claim 15, wherein the machine frame includes a channel formed into a bottom of the frame and configured to have the tube of the torsion member mounted therein.

17. The power machine of claim 15, wherein the mounting bracket and the torsion member are secured to the machine frame entirely inside of a frame wall of the machine frame.

18. The power machine of claim 15, wherein the apertures of the at least two surfaces of the mounting bracket and the corresponding apertures on the machine frame are positioned to receive the fasteners entirely inside of a frame wall of the machine frame to secure the mounting bracket and the torsion member to the machine frame.

19. The power machine of claim 15, wherein the mounting bracket is configured such that the apertures, on the at least two separate surfaces, accept the fasteners with the fasteners oriented substantially perpendicular to a longitudinal direction of the tube of the corresponding torsion member.

20. The power machine of claim 15, wherein the mounting bracket has a top surface and at least one side surface.

21. A power machine, comprising:
a machine frame;
a track frame positioned on a side of the machine frame; and
a mounting structure mounting the track frame to the machine frame, the mounting structure comprising:
  a torsion member having a tube; and
  a mounting bracket attached to the tube including at least two surfaces having apertures configured to align with apertures on the machine frame to accept fasteners to secure the mounting bracket and the torsion member to the machine frame;
wherein the mounting bracket and the torsion member are secured to the machine frame entirely inside of a frame wall of the machine frame.

22. A power machine, comprising:
a machine frame;
a track frame positioned on a side of the machine frame; and
a mounting structure mounting the track frame to the machine frame, the mounting structure comprising:
  a torsion member having a tube; and
  a mounting bracket attached to the tube including at least two surfaces having apertures configured to align with apertures on the machine frame to accept fasteners to secure the mounting bracket and the torsion member to the machine frame;
wherein the apertures of the at least two surfaces of the mounting bracket and the corresponding apertures on the machine frame are positioned to receive the fasteners entirely inside of a frame wall of the machine frame to secure the mounting bracket and the torsion member to the machine frame.

23. A power machine, comprising:
a machine frame;
a track frame positioned on a side of the machine frame; and
a mounting structure mounting the track frame to the machine frame, the mounting structure comprising:
  a torsion member having a tube; and
  a mounting bracket attached to the tube including at least two surfaces having apertures configured to align with apertures on the machine frame to accept fasteners to secure the mounting bracket and the torsion member to the machine frame;
wherein the mounting bracket is configured such that the apertures, on the at least two separate surfaces, accept the fasteners with the fasteners oriented substantially perpendicular to a longitudinal direction of the tube of the corresponding torsion member.

* * * * *